US007234534B2

(12) United States Patent
Froland et al.

(10) Patent No.: US 7,234,534 B2
(45) Date of Patent: Jun. 26, 2007

(54) FIREFIGHTING VEHICLE

(75) Inventors: Benjamin I. Froland, Neenah, WI (US); Michael R. Moore, Larsen, WI (US); Stanley W. Schultz, Appleton, WI (US); Kenneth P. Sebo, Reedsville, WI (US); Todd S. Stecker, Appleton, WI (US); David N. Budiac, Appleton, WI (US)

(73) Assignee: Pierce Manufacturing Company, Appleton, WI (US)

( * ) Notice: Subject to any disclaimer, the term of this patent is extended or adjusted under 35 U.S.C. 154(b) by 202 days.

(21) Appl. No.: 10/923,186

(22) Filed: Aug. 20, 2004

(65) Prior Publication Data

US 2006/0037760 A1 Feb. 23, 2006

(51) Int. Cl.

| | |
|---|---|
| ***A62C 27/00*** | (2006.01) |
| ***A62C 25/00*** | (2006.01) |
| ***A01G 25/09*** | (2006.01) |
| ***B05B 9/00*** | (2006.01) |

(52) U.S. Cl. ............................ 169/24; 169/51; 169/52; 239/146; 239/149; 239/157

(58) Field of Classification Search ................. 169/24, 169/51, 52; 239/146, 149, 157, 172, 174, 239/175; 180/9.1, 9.28, 9.3, 6.7

See application file for complete search history.

(56) References Cited

U.S. PATENT DOCUMENTS 2,632,577 A 3/1953 Sacco
4,037,664 A * 7/1977 Gibson ........................ 169/15
4,059,170 A 11/1977 Young
4,084,522 A * 4/1978 Younger ........................ 111/14
4,185,924 A * 1/1980 Graham ........................ 366/10
4,373,600 A * 2/1983 Buschbom et al. ......... 180/212
4,811,804 A * 3/1989 Ewers et al. ............... 180/53.8
5,346,334 A * 9/1994 Einaru et al. ............... 405/269
5,368,317 A 11/1994 McCombs et al.
5,467,827 A 11/1995 McLoughlin
5,553,673 A 9/1996 Hackman
5,617,696 A 4/1997 Young
5,785,372 A 7/1998 Glatzmeier et al.
5,909,780 A * 6/1999 De Andrade ............... 180/9.58
6,289,995 B1 * 9/2001 Fuller .......................... 169/52
6,394,534 B1 5/2002 Dean
6,695,328 B2 * 2/2004 Cope .................... 280/124.111
6,769,733 B2 * 8/2004 Seksaria et al. ............ 296/192

* cited by examiner

*Primary Examiner*—Davis Hwu
(74) *Attorney, Agent, or Firm*—Foley & Lardner LLP

(57) ABSTRACT

A firefighting vehicle includes a frame, a fluid pump, and a body having a compartment. In one embodiment, a drive line of the pump passes through a transverse cross member of the frame. In another embodiment, the body includes opposite side sections sandwiching the pump therebetween. In another embodiment, the vehicle includes a pumphouse module in which the body is mounted so as to move in unison with the body relative to the frame. In another embodiment, the vehicle includes a control panel operably coupled to the pump and extending through an opening in the compartment. In another embodiment, the compartment includes a wall having a C-shaped bulkhead.

37 Claims, 12 Drawing Sheets

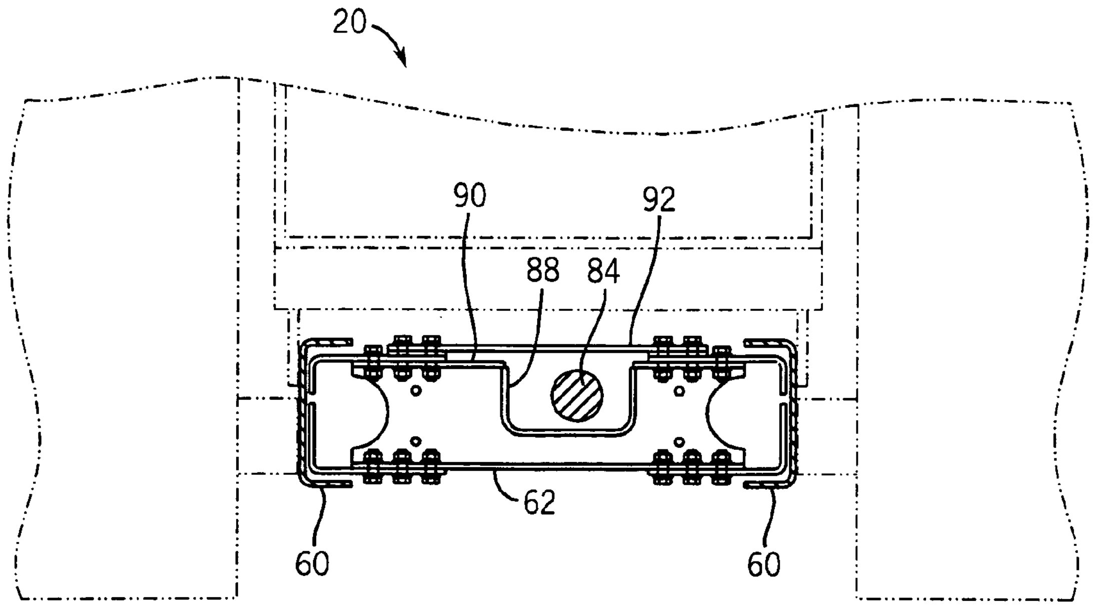
FIG. 7
FIG. 6
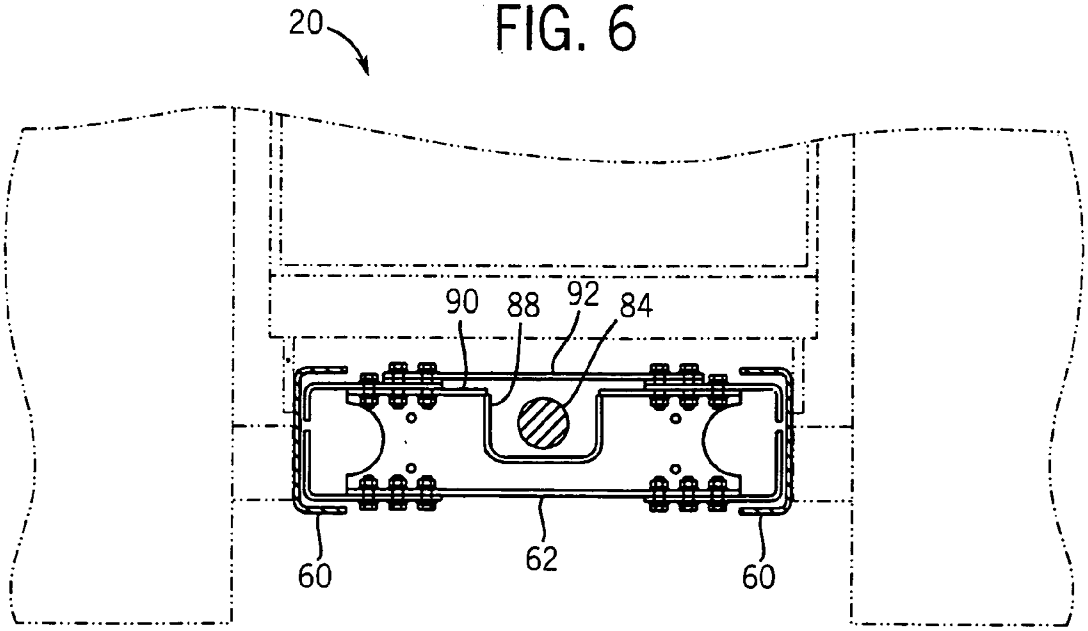

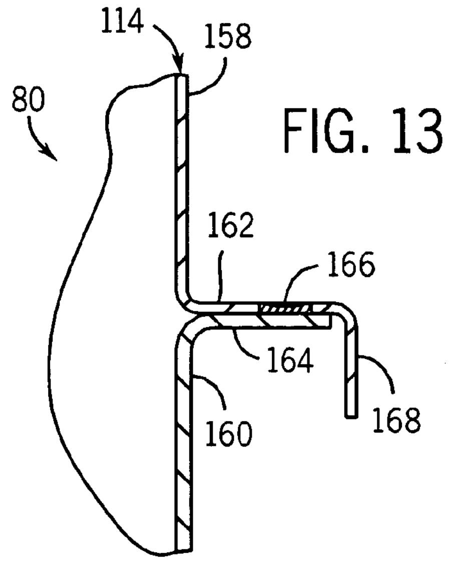
FIG. 13
FIG. 14
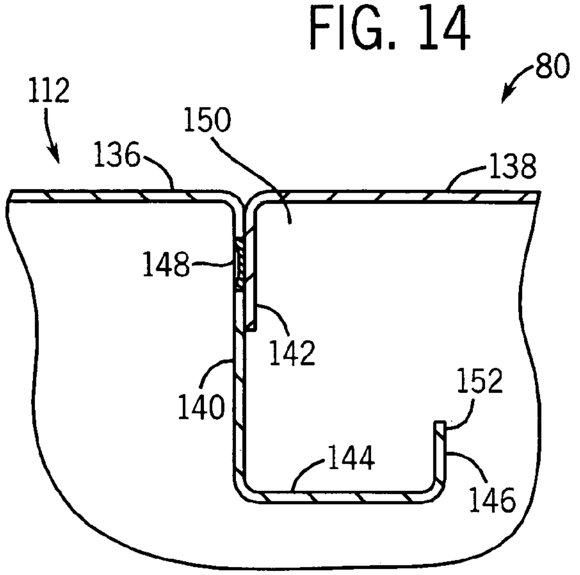
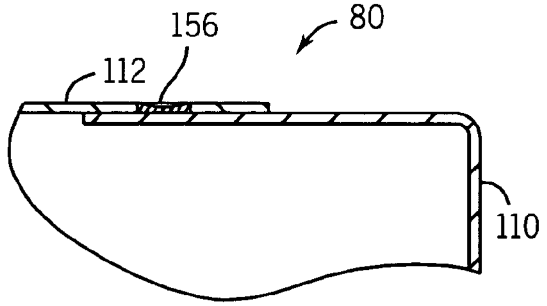
FIG. 15
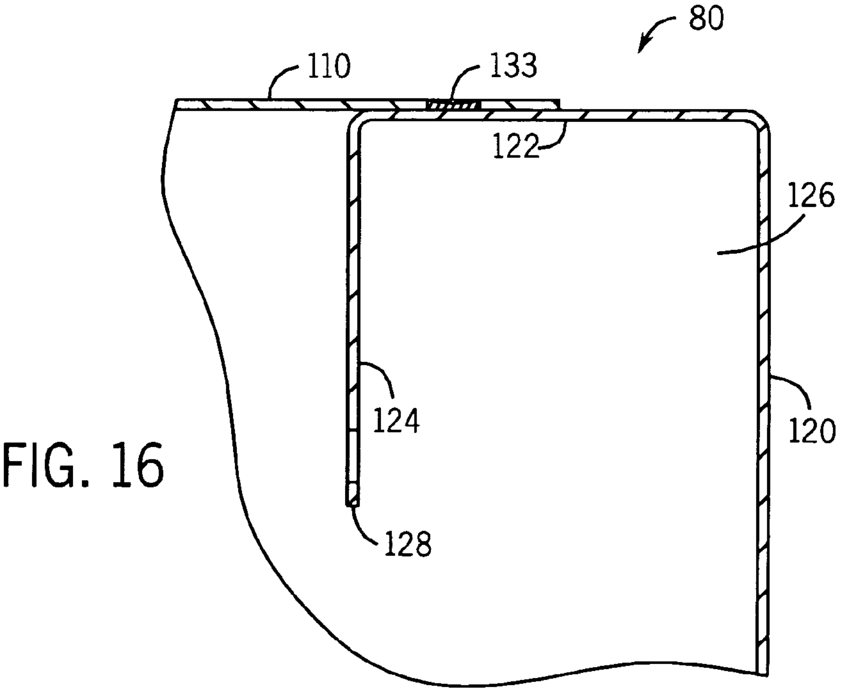
FIG. 16

FIREFIGHTING VEHICLE

BACKGROUND

Firefighting vehicles come in a variety of different forms. For example, certain firefighting vehicles, known as pumpers, are designed to deliver large amounts of firefighting agents, such as foam or water. Other firefighting vehicles, known as aerials, are designed to additionally elevate ladders or booms. Some firefighting vehicles, known as airport rescue firefighting vehicles, are designed for responding to unique firefighting circumstances and may be designed for delivering firefighting agents to difficult to reach locations.

Most firefighting vehicles include a pump for delivering firefighting agents and a compartmentalized body in which firefighting equipment is stored and accessed. Although further development of firefighting vehicles has been ongoing for many years, existing firefighting vehicles are difficult to construct and many times lack an attractive finished appearance. Due to inefficient body and compartment designs, some firefighting vehicles are also bulky and have a higher center of gravity, making high speed maneuvering through traffic and narrow thoroughfares difficult.

BRIEF DESCRIPTION OF THE DRAWINGS

FIG. 6 is a sectional view of the vehicle of FIG. 5 taken along line 6—6.

FIG. 7 is a sectional view of the vehicle of FIG. 5 taken along line 7—7.

FIG. 13 is a fragmentary sectional view of the compartment of FIG. 12 taken along line 13—13.

FIG. 14 is a fragmentary sectional view of the body of FIG. 12 taken along line 14—14.

FIG. 15 is a fragmentary sectional view of the body of FIG. 12 taken along line 15—15.

FIG. 16 is a fragmentary sectional view of the body of FIG. 12 taken along line 16—16.

DETAILED DESCRIPTION OF THE EXAMPLE EMBODIMENT

Figure 1:
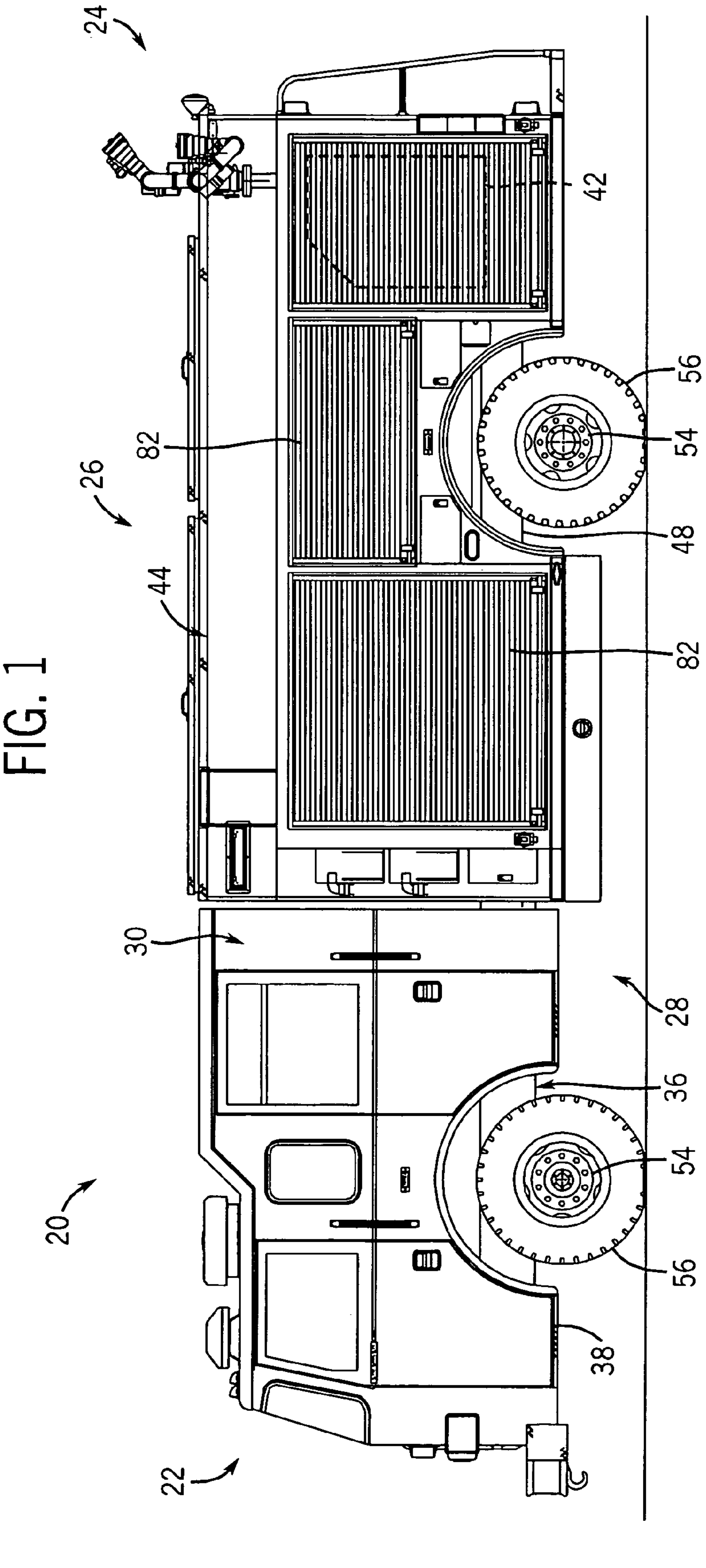
FIG. 1 is a side elevational view of a firefighting vehicle according to one exemplary embodiment.
Figure 2:
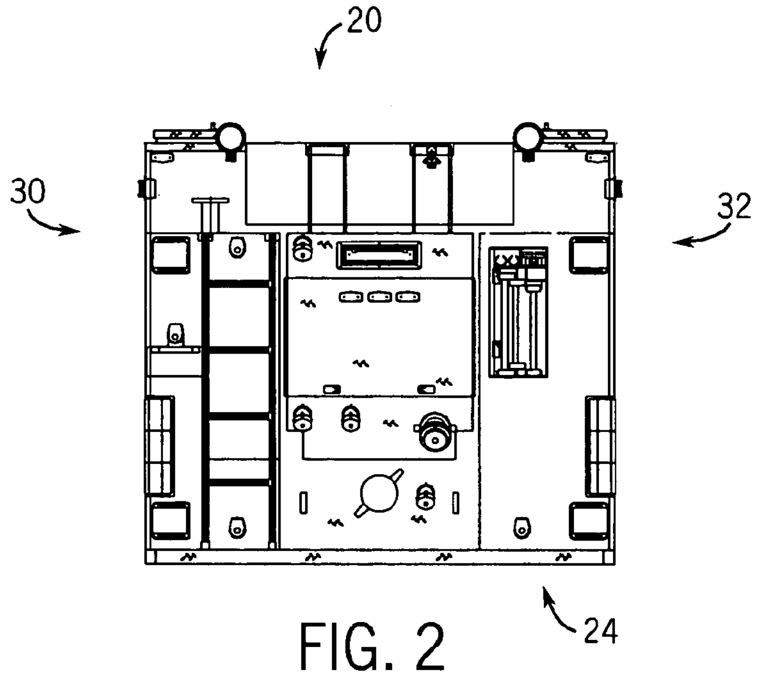
FIG. 2 is a rear elevational view of the vehicle of FIG. 1.
Figure 3:
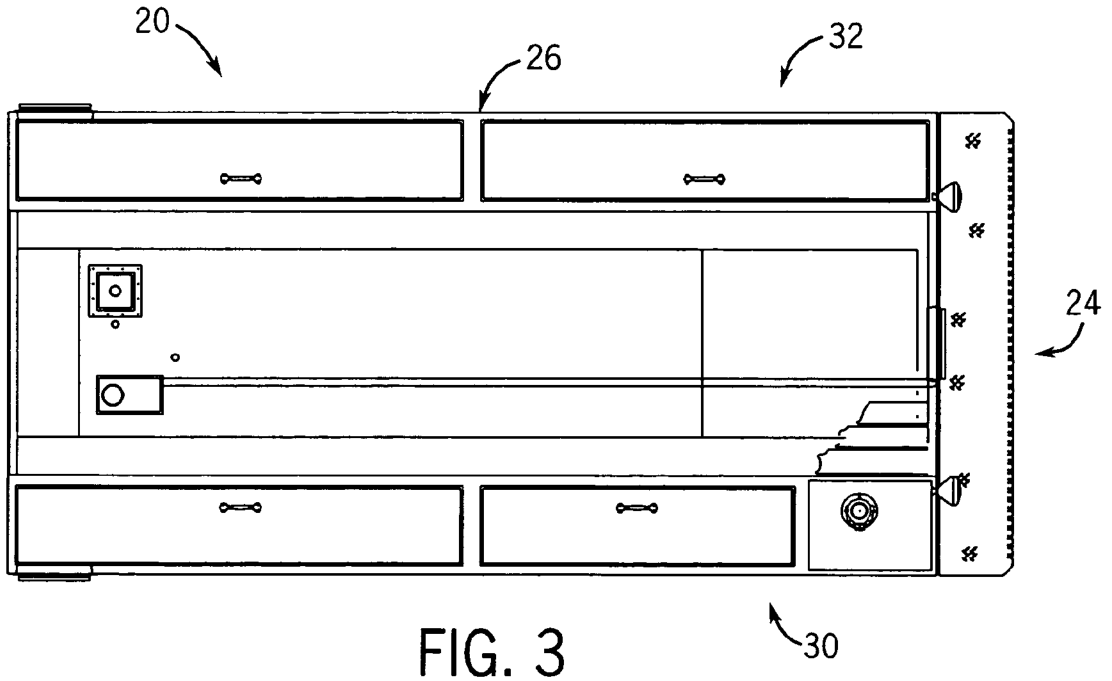
FIG. 3 is a top plan view of a rear portion of the vehicle of FIG. 1.

FIG. 1 illustrates firefighting vehicle 20 which is configured to deliver firefighting agents, such as water, foam or other agents, to a point of interest. Vehicle 20 is a self-propelled vehicle having a front 22, a rear 24, a top 26, a bottom 28 and of opposite sides 30, 32 (shown in FIG. 2). Vehicle 20 further includes a chassis 36, cab 38, an agent storage unit 40 (shown in FIG. 4), a pumphouse module 42 and a rear body 44. Chassis 36 generally includes a functional parts of vehicle 20 such as frame 48, a suspension (not shown), exhaust system (now shown), brakes (not shown), engine (not shown), transmission (not shown), rear axles 50 (shown in FIG. 5), drive train 52 (shown in FIG. 5), fuel system (not shown), wheels 54 and tires 56.

Figure 4:
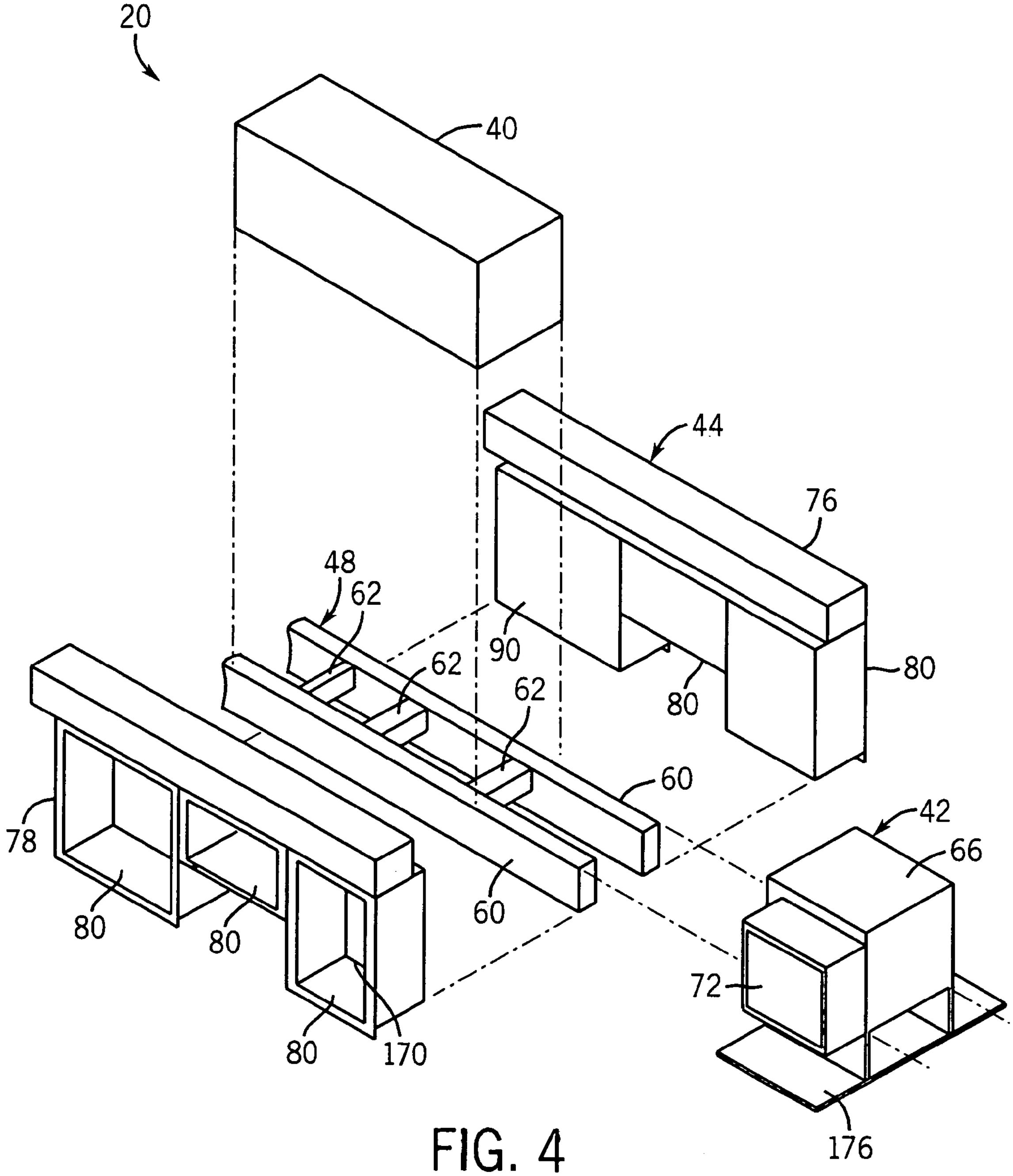
FIG. 4 is a fragmentary exploded perspective view schematically illustrating the rear portion of the vehicle of FIG. 1.

Frame 48 generally comprises one or more structures configured to serve as the base or foundation for the remaining components of vehicle 20. In the embodiment shown, frame 48 extends substantially along an entire length of vehicle 20 along a longitudinal center line of vehicle 20. As shown by FIG. 4, frame 48 generally includes a pair of opposite parallel longitudinally extending rails 60 which are joined by transversally extending cross members 62. In other embodiments, frame 48 may have other configurations.

Cab 38 is supported by frame 48 and functions as a occupant compartment for vehicle 20. Although cab 38 is illustrated as extending at front 22 beyond a forward-most wheel 54, cab 38 may alternatively be located rearward of the forward-most extending wheel 54. Cab 38 may have a variety of other configurations other than the one example shown.

Firefighting agent storage system 40 (shown in FIG. 4) comprises one or more tanks or other containers configured to store one or more firefighting agents such as water, foam, fluid chemicals, dry chemicals and the like. In one particular embodiment, storage system 40 comprises a water tank and a foam tank. In another embodiment, storage system 40 comprises a liquid or water tank. In the particular embodiment shown, storage system 40 includes a tank of at least 500 gallons and nominally about 1,100 gallons. As shown by FIG. 4, storage system 40 is supported by frame 48 forward of pumphouse module 42 and between portions of body 44. In other embodiments, storage system 40 may be positioned at other locations of vehicle 20.

Pumphouse module 42 is coupled to frame 48 and is configured to pressurize or pump firefighting agent from storage system 40 for delivery by a hose, turret, nozzle or other agent directing means. Module 42 generally includes support framework 66, pump 68 (shown in FIG. 5), plumbing 70 and pump control panel 72. Support framework 66 comprises of one or more structures which at least partially house and support pump 68, plumbing 70 and control panel 72 as a single, self-contained unit. As will be described in greater detail hereafter, framework 66 additionally interfaces between frame 48 and body 44 by supporting body 44 relative to frame 48 such that framework 66 and body 44 are moved in unison relative to frame 48. In other embodiments, support framework 66 may alternatively omit this feature.

Because support framework 66 supports pump 68, plumbing 70 and control panel 72 as a single self-contained unit, pump 68, plumbing 70 and control panel 72 may be assembled to one another and to framework 66 independent of frame 48, storage system 40 or body 44. Consequently, module 42 may be built with plumbing 70 installed, linkages run and pump control panel 72 installed while body 44, chassis 36 and remaining other structures are being built concurrently.

Pump 68 comprises a fluid pump configured to pressurize and pump the firefighting agent and to direct the pressurized firefighting agent to various fluid outputs of vehicle 20. Pump 68 is mounted in a cradle-like structure provided by framework 66. According to one exemplary embodiment, pump 68 is configured to pump at least 500 gallons of firefighting agent per minute and up to at least about 2,000 gallons of firefighting agent per minute. In other embodiments, pump 68 may have other configurations and may be directly coupled to and supported by frame 48.

Pump control panel 72 comprises an arrangement configured to enable control of pump 68 and plumbing 70. Pump control panel 72 includes one or more displays and gauges that communicate to an operator the status of pump 68 and plumbing 70. Control panel 72 further includes one or more buttons, levers, switches or other control mechanisms configured to enable an operator to manually control and adjust the operation or the status and configuration of pump 68 and the valves of plumbing 70. In the particular embodiment shown, pump control panel 72 includes one or more rigid linkages that extend from pump control panel 72 and that are connected to global actuation portions of pump 68 and the valves of plumbing 70. Such linkages are pushed, pulled or rotated to adjust the operation of pump 68 and the valves of plumbing 70. Use of such linkages enables reliable control of the operation of pump 68 and the valves of plumbing 70 without requiring electrical power and additional wiring. In other embodiments, such linkages may alternatively be replaced with electrical control mechanisms.

Body 44 generally comprises the compartmentalized portion of vehicle 20 which forms an exterior of vehicle 20 rearward of cab 38 and which is configured for storing firefighting equipment. As shown by FIG. 4, body 44 includes side sections 76, 78. Each side section 76, 78 includes at least one compartment 80 configured for the storage of firefighting equipment. As shown by FIG. 1, compartments 80 include covers or doors 82 that conceal and protect the contents of the compartment. In alternative embodiments, compartments 80 and doors 82 may be replaced with drawers or trays.

As shown by FIGS. 1 and 4, side body sections 76 and 78 each generally have an inverted U-shape so as to wrap about an upper side of a rearward most tire 56. Each side body section 76, 78 has a first volume forward of tire 56, a second volume above tire 56 and a third volume rearward of tire 56. Side body sections 76 and 78 are mounted to the remainder of vehicle 20 from opposite lateral sides of vehicle 20. In particular, side body sections 76 and 78 extend an opposite lateral sides of storage system 40 and on opposite lateral sides of pumphouse module 42. As will described in greater detail hereafter, portions of pumphouse module 42 project through openings in at least one of side body sections 76, 78. As will be further described hereafter, side body sections 76 and 78 are supported by pumphouse module 42 so as to move in unison with module 42 relative to frame 48. In other embodiments, side body sections 76 and 78 may alternatively be configured so as to not be supported by pumphouse module 42 and may also alternatively be configured such that pumphouse module 42 does not project through at least one of side body sections 76, 78.

Figure 5:
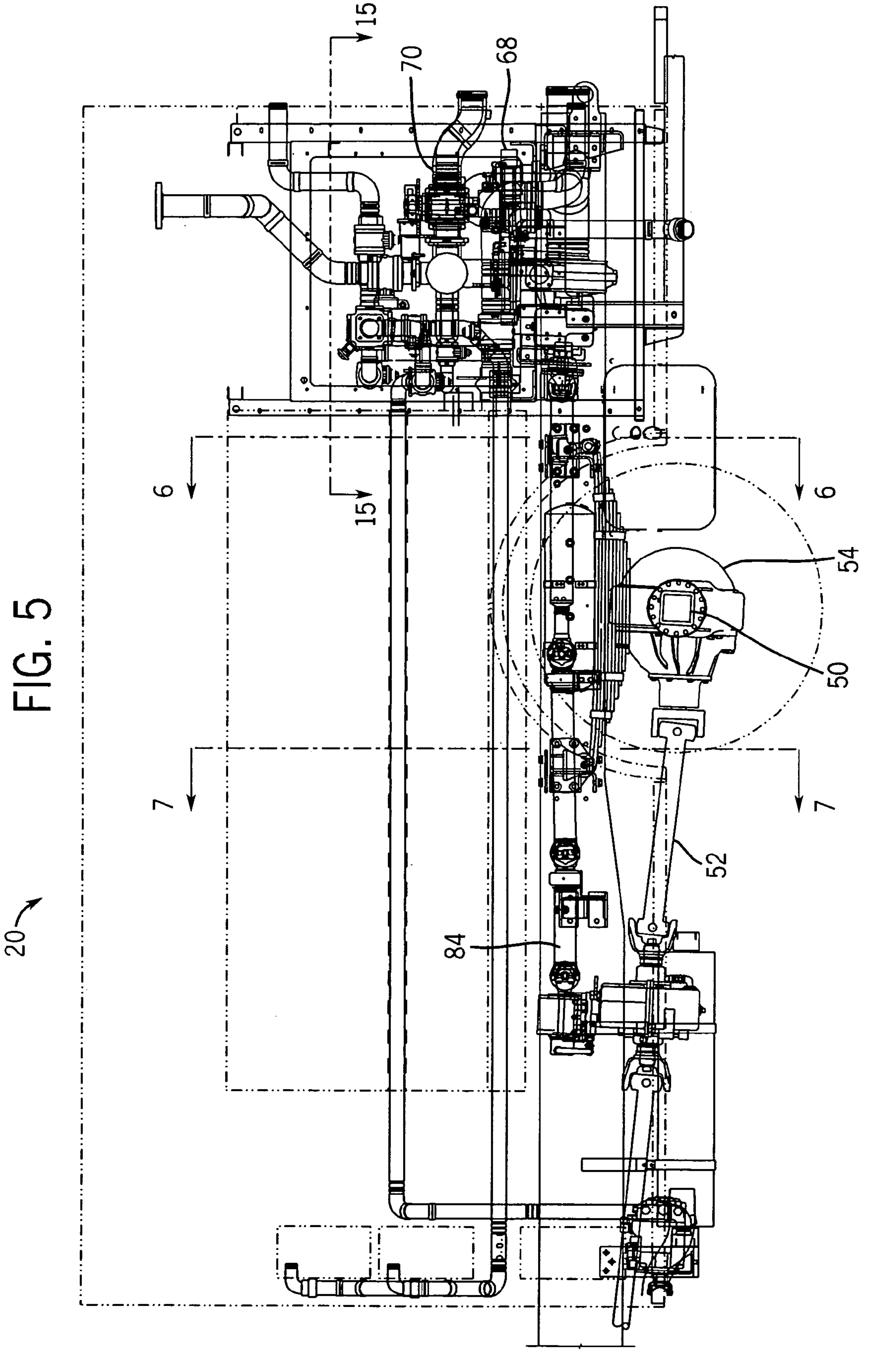
FIG. 5 is a side elevational view of a rear portion of the vehicle of FIG. 1 with portions removed and portions shown in phantom for purposes of illustration.

FIGS. 5–7 illustrate vehicle 20 and, in particular, frame 48, in greater detail. As shown by FIG. 5, vehicle 20 additionally includes a pump drive line 84 which is mechanically coupled to main drive train 52 and which is mechanically coupled to pump 68 so as to drive pump 68. As shown by FIGS. 6 and 7, drive line 84 generally extends along a longitudinal center line of vehicle 20 between rails 60. Cross members 62 at least partially wrap about drive line 84, enabling drive line 84 to be positioned below an upper most extremity of rail 60. Because drive line 84 is kept below a top of frame rail 60, a greater volume of the space above rail 60 may be employed for other uses. For example, the tank of storage system 40 may be enlarged to increase its water capacity. In addition, components of vehicle 20 may be mounted at a generally lower location. For example, the tank of storage system 40 may be mounted lower and pump 68 of module 42 may also have a lower mounting. This results in a lower center of gravity and provides vehicle 20 with improved maneuverability.

As further shown by FIGS. 6 and 7, cross member 62 includes a recess or opening 88 which receives drive line 84. Opening 88 extends from a perimeter 90 of cross member 62. This enables drive line 84 to be easily positioned within openings 88 during assembly. In other embodiments, drive line 84 may alternatively pass through openings in drive members 62 that completely surround drive line 84.

To partially enclose drive line 84 within opening 88, vehicle 20 additionally includes one or more covers 92 which are removably fastened to cross members 62 over openings 88 and over drive line 84. Covers 92 shield rotating drive line 84. Because covers 92 are removably fastened to cross members 62, covers 92 may be easily removed to allow access to drive line 84.

Figure 8:
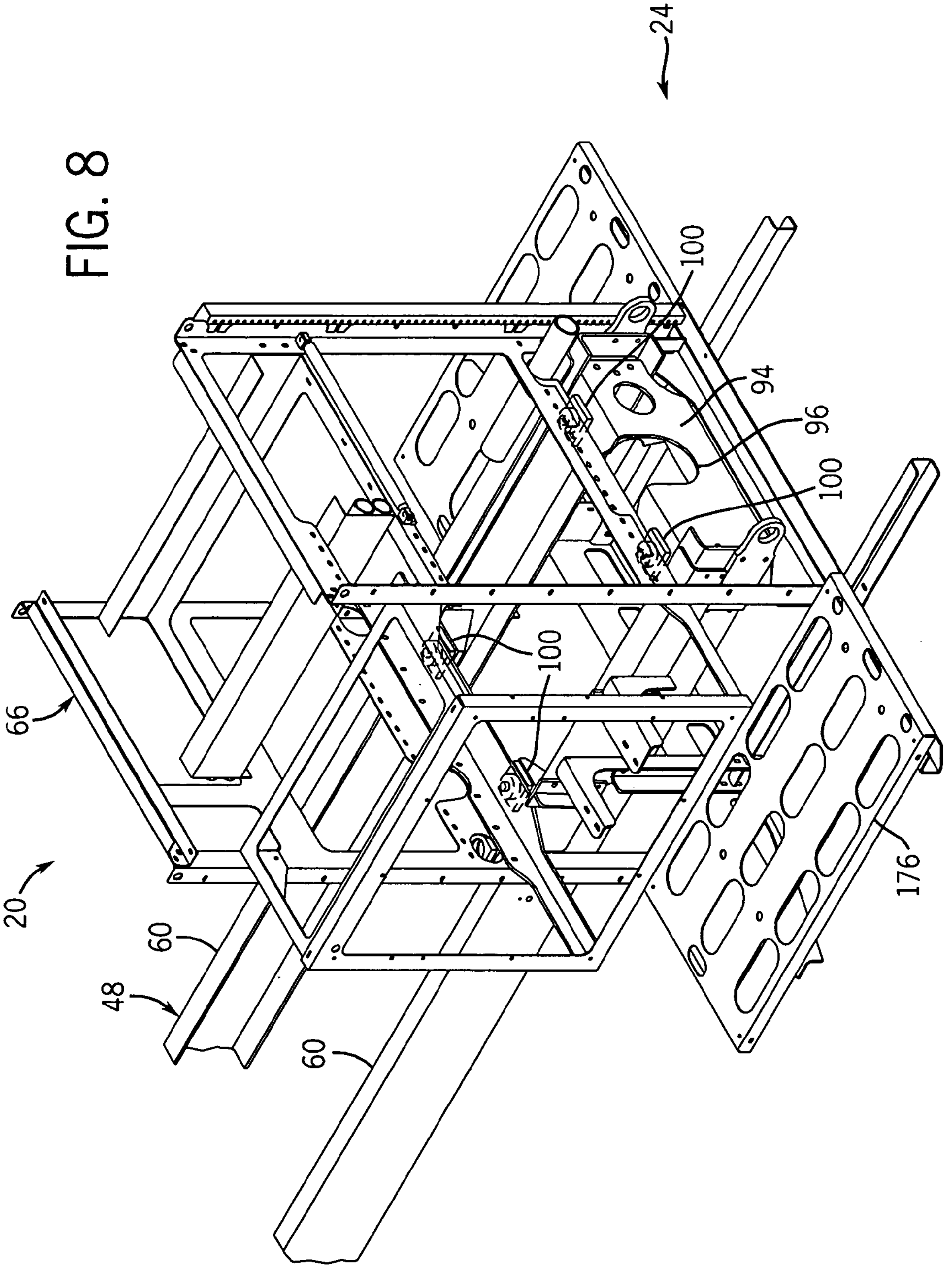
FIG. 8 is a top perspective view of the rear portion of the vehicle of FIG. 1 illustrating a pumphouse module support structure joined to rails of a vehicle frame.
Figure 10:
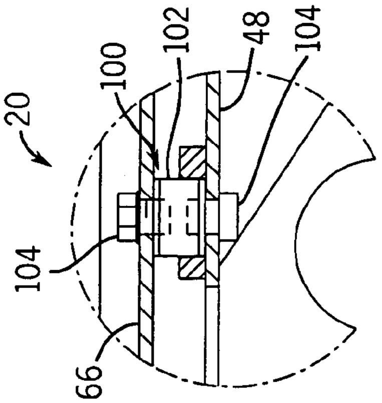
FIG. 10 is enlarged view of the rear portion of FIG. 9 taken along lines 10—10.
Figure 9:
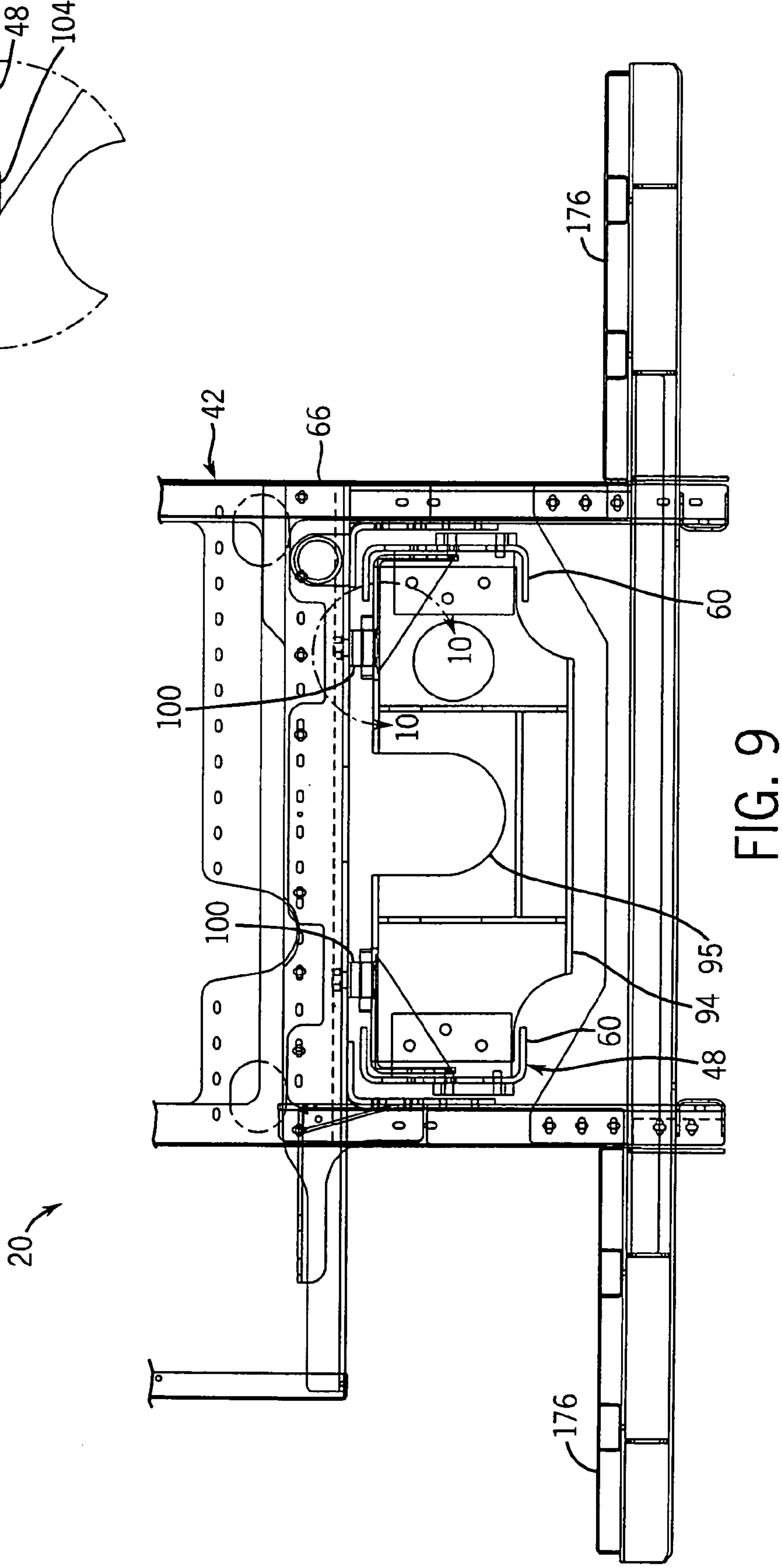
FIG. 9 is a rear elevational view of the rear portion shown in FIG. 8.
Figure 11:
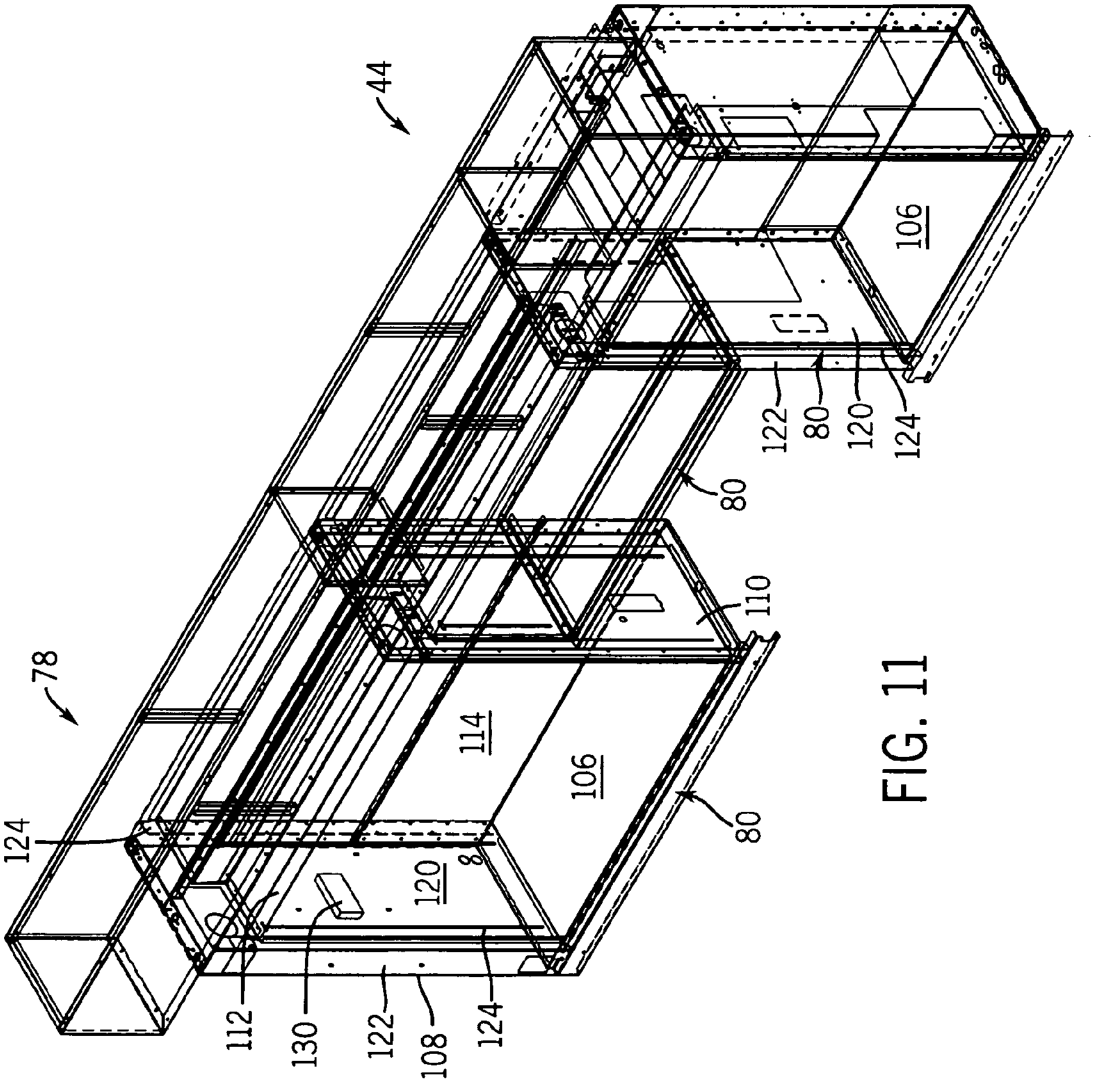
FIG. 11 is a top perspective view of a side body section of the vehicle of FIG. 1.

FIGS. 8–10 illustrate pumphouse module 42 in greater detail. In particular, FIGS. 8–10 illustrate support structure or framework 66 of module 42 and its mounting to frame 48. As shown by FIG. 8, support framework 66 is configured to house pump 68, plumbing 70, linkages and a control panel 72. Support framework 66 extends across and wraps about rails 60, enabling support framework 66 to be mounted to frame 48 at a lower position to lower the center of gravity of vehicle 20. As shown by FIGS. 8 and 9, frame 48 additionally includes one or more cross members 94 which extend between rails 60. Cross member 94 is mounted between rails 60 and includes an opening 95 extending from a perimeter of cross member 94. Opening 95 is sized and configured to enable a firefighting agent conduit, such as piping or hose, to pass through cross member 94 towards the rear 24 of vehicle 20. Cross member 94 forms part of a cradle that assists in supporting pump 68 below a top of rail 60, further lowering the center of gravity of vehicle 20. Cross member 94 is further configured to enable movement of pump 68, plumbing 70 and plumbing 70 relative to cross member 94 and frame 48. In other embodiments, plumbing 70 may alternatively or additionally be supported below the top of rails 60, or pump 68 and plumbing 70 may be entirely supported above rails 60.

As further shown by FIGS. 8–10, pumphouse module 42 is entirely supported relative to frame 48 by isolators or interfaces 100. Interfaces 100 extend between frame 48 and support structure 66 of pumphouse module 42. Interfaces 100 are configured to enable pumphouse module 42 to have limited movement relative to frame 48. At the same time, interfaces 100 are configured to absorb shock and vibration. In the particular embodiment illustrated, interfaces 100 comprise elastomeric members formed from elastomeric materials, such as rubber, which flexes to permit limited relative movement between support structure 66 and frame 48 while absorbing shock and vibration. As shown by FIG. 10, each interface 100 includes an elastomeric portion 102 and fasteners 104. Fasteners 104 extend through portions of frame 48 and portions of structure 66 into member 102. Elastomeric portion 102 longitudinally and laterally flexes with sideways and forward-rearward movement of module 42 relative to frame 48 and compresses or stretches during upward and downward movement of module 42 relative to frame 48.

As described above with respect to FIG. 4, pumphouse module 42 supports sections 76 and 78 of body 44 relative to frame 48. In other words, pumphouse module 42 serves as an interface between body 80 and frame 48. Consequently, interfaces 100 also serve to support body sections 76 and 78 relative to frame 48. As a result, sections 76 and 78 of body 44 move substantially in unison with pumphouse module 42 relative to frame 48. This greatly increases the strength and stability at rear 24 of vehicle 20. Because pumphouse module 42 and body 44 move in unison when vehicle 20 is in motion, binding of pump operator linkages extending from pump 68 to an exterior of vehicle 20 through walls, panels or other structures connected to or formed as a part of body 44, which would otherwise occur if pumphouse module 42 and body 44 were to move independently, is minimized or prevented.

Figure 12:
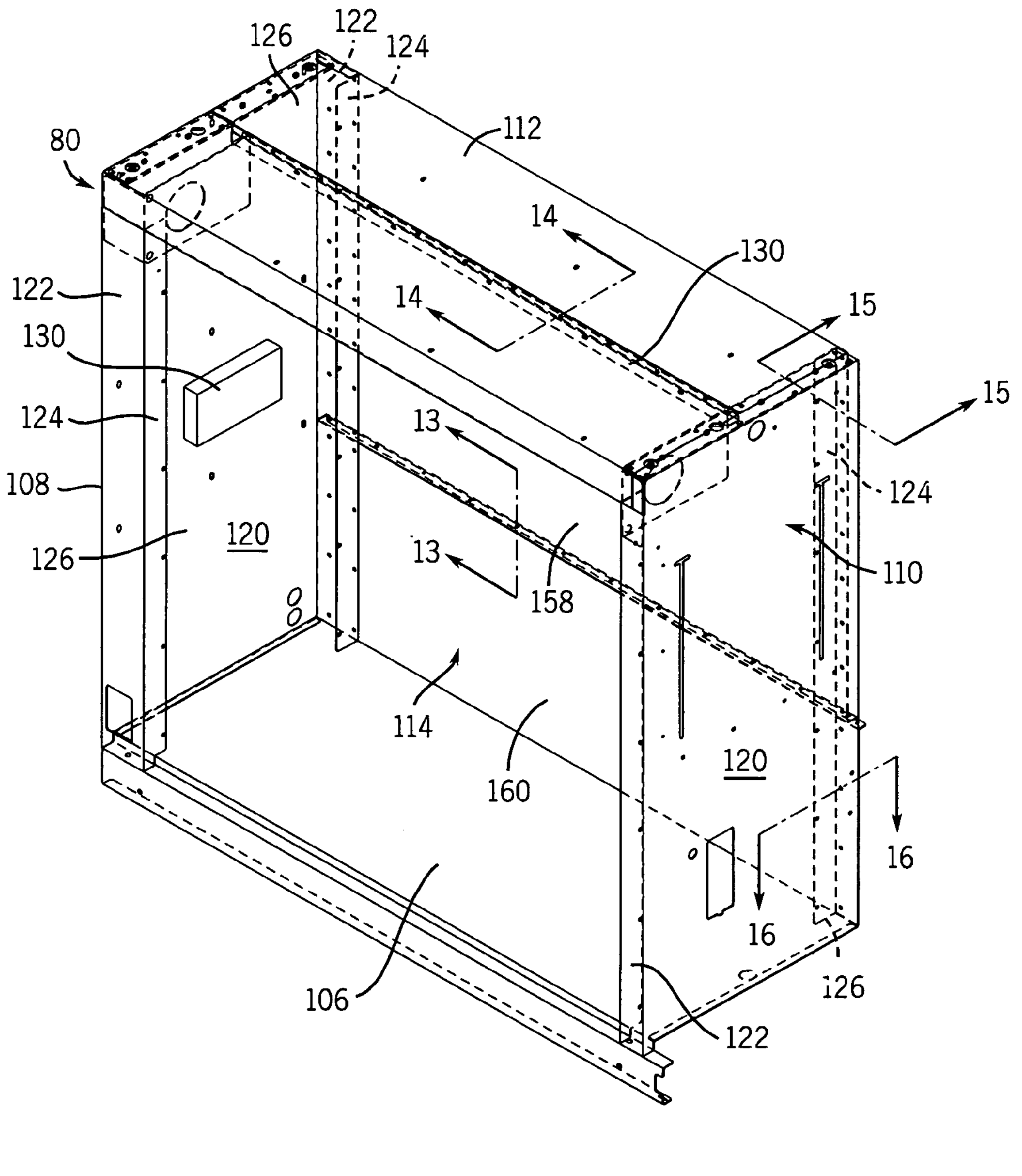
FIG. 12 is a top perspective view of a compartment of the side body section of FIG. 11.

FIGS. 11–16 illustrate body side section 78 in greater detail. In particular, FIG. 12 illustrates a forward-most compartment 80 of side section 78. As shown by FIG. 12, a forward-most compartment 80 includes floor 106, side bulkheads 108, 110, top bulkhead 112 and rear or back bulkhead 114. Floor 106 provides a floor surface for compartment 80. Side bulkheads 108, 110 are substantially identical to one another and face one another. Side bulkheads 108, 110 are each generally C-shaped with an opening of the C-shape facing an interior of compartment 80.

As shown by FIGS. 12 and 16, each side bulkhead 108, 110 includes an outer wall 120, a pair of opposite end walls 122 (only one of which is shown) and a pair of inwardly extending walls 124 (only one of which is shown in FIG. 10). Outer wall 120 extends along an exterior of compartment 80. End walls 122 extend from outer wall 120 between outer wall 120 and walls 124. In the particular example shown, end walls 124 extend substantially perpendicular to wall 120. Interior extending walls 124 extend from end walls 122 towards one another opposite outer wall 120. In the particular example shown, walls 124 are generally coplanar, extend generally perpendicular to end walls 122 and parallel to outer walls 120. Interior extending walls 124 are spaced from outer wall 120 to form a cavity 126 along wall 120. Walls 124 do not extend entirely across and opposite to wall 120 so as to form an opening 128 providing access to cavities 126. Cavities 126 provide a recessed partially hidden volume along perimeters of compartment 80. Cavities 126 enable components to be placed within the cavity generally out of sight. Examples of components stored in cavity 126 include wire harnesses, breaker boxes, vents, shelving tracks, battery conditioners and generator controls. FIG. 12 schematically illustrates a component 130 comprising one of the aforementioned components which is located within cavity 126. Interior extending walls 124 conceal component 130. In addition, walls 124 provide surfaces for supporting panels, such as panel 132 (shown in FIG. 18) across opening 128 and cavity 126. Such panels 132 further conceal components 130 within cavity 126.

Figure 18:
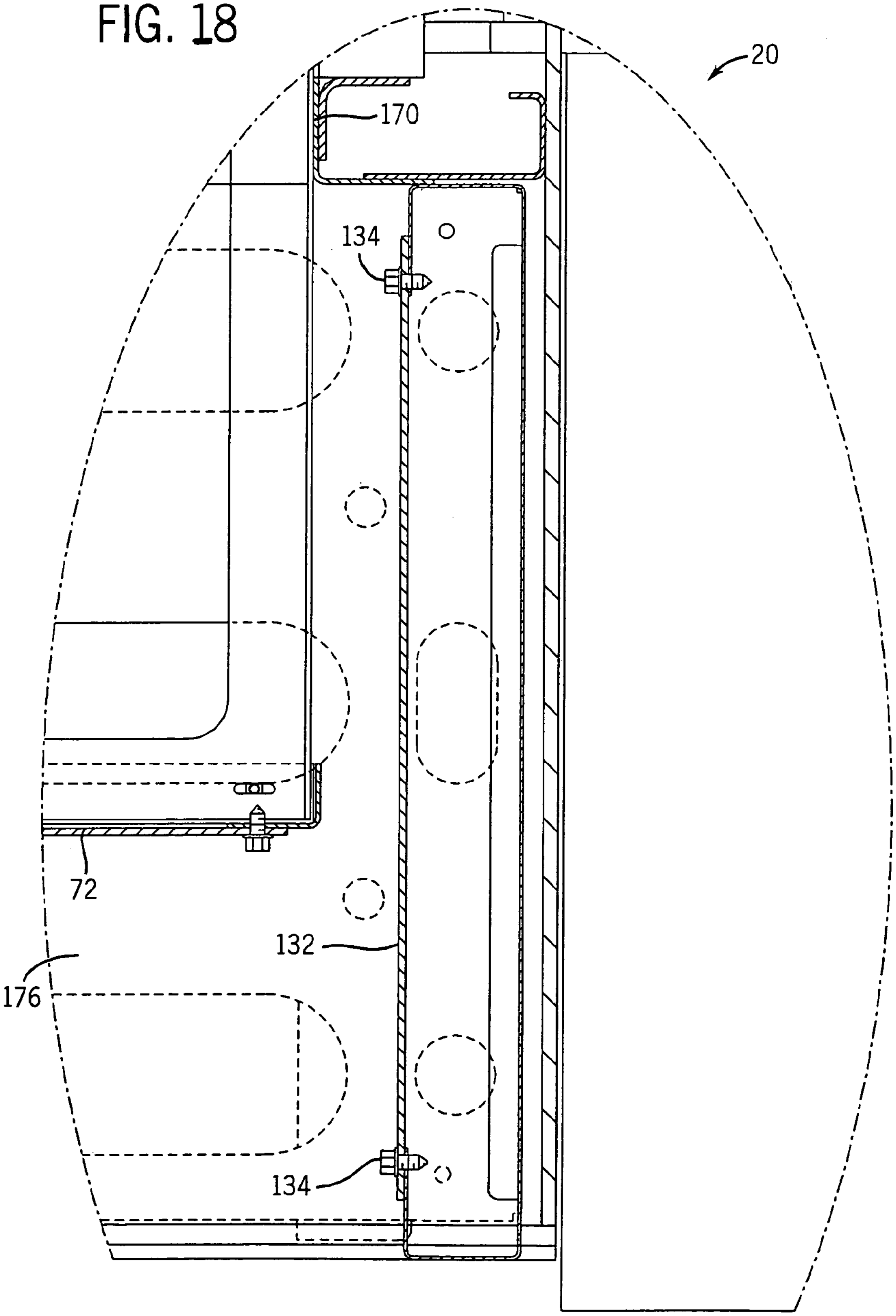
FIG. 18 is an enlarged view of the portion of FIG. 17 taken along line 18—18.

In addition, panels 122 cover and conceal generally more unsightly, but more rigid and sturdy connection joints. For example, in one embodiment, side bulkheads 108 and 110 include multiple weld seams resulting from the formation of bulkheads 108, 110 and/or adjoining of bulkheads 108, 110 to adjacent structures. Such welded seams are generally located within and along cavity 126. As shown by FIG. 18, since panel 132 is not a structural panel supporting other structures associated with compartment 80, panel 132 may be formed of a lighter, less expensive and more aesthetically attractive material while covering the heavier material of outer wall 120 and end walls 122 which may have weld seams. In contrast, panel 132 may be fastened to interior walls 124 by one or more fasteners 134.

Although fasteners 134 are illustrated as threaded screws, fasteners 134 may alternatively comprise bolts, rivets or other fastening members. In other embodiments, panel 132 may be configured to snap or clip onto walls 124 without the need for additional independent fasteners. Because panel 132 is simply fastened or mounted to interior extending walls 124 in a releasable fashion, panel 132 may be removed to provide access to cavity 126 for repair or replacement of an existing component 130 or insertion of an additional component 130.

Top bulkhead 112 extends along a top of compartment 80. Like side bulkheads 108, 110, top bulkhead 112 is generally C-shaped having an interior cavity 126 facing the interior of compartment 80. As shown by FIG. 14, in the particular embodiment illustrated, top bulkhead 112 is formed by two panels 136, 138 having down-turned end portions or flanges 140 and 142, respectively. Panel 136 additionally includes a generally horizontal flange 144 and upturn flanged 146. Down-turned flanges 140 and 142 provide surfaces for joining panels 136 and 138. In the particular example shown, flanges 140 and 142 are joined by weld 148. In other embodiments, other joining methods may be used to secure flanges 140 and 142 together. Flange 144 extends from flange 140 opposite panel 138. In the particular example shown, flange 144 extends generally perpendicular to flange 140 and parallel to panel 138. In other embodiments, flange 144 may extend general parallel to panel 136. Flange 144 is spaced from panels 136 and 138 to form a cavity 150 having an access opening 152 supported by flange 146. Flange 146 extends from flange 144, strengthens and rigidifies flange 144 and provides a smooth surface or corner at opening 146.

Like cavity 126, cavity 150 is a partially concealed recess. In particular embodiments, cavity 150 may be utilized to contain and conceal components 130. In addition, flange 144 provides a mounting surface against which a false ceiling may be attached across opening 146 and opposite to both panels 136 and 138. An example of such a false ceiling is panel 132 and fasteners 134 shown in FIG. 18. In such an example, fasteners 134 pass through panel 132 and through flange 144. In other embodiments, such a false ceiling may be secured to flange 144 by other fasteners or may be configured to snap or otherwise mechanically mount to flange 144 or, alternatively, flange 146 or flange 140.

Overall, a false bulkhead or false ceiling is provided by panel 132 when mounted to side bulkheads 108, 110 or upper bulkhead 112. The false bulkhead or ceiling conceals any component 130 contained within cavity 126 or cavity 150. The false bulkhead or the false ceiling further conceals any weld seams. In particular, such false bulkheads or false ceilings conceal weld seams 133, 148 and 156 (shown in FIG. 15).

In the particular example illustrated, back bulkhead 114 is formed from two walls 158, 160 having rear-wardly extending flanges 162 and 164 respectively which are joined by a weld seam 166. Weld seam 166 is located behind and exterior to the compartment 80 and is not visible. As shown by FIG. 13, wall 158 additionally includes angled flange 168 which provides strength. In other embodiments, flanges 162, 164 and 168 may alternatively project into the interior of compartment 80, wherein flange 168 serves as a mounting structure for a rear false bulkhead to cover or conceal weld seam 166. Because weld seams 133, 148, 156 and 166 are all concealed, compartment 80 is formed by a welded construction which is stronger. At the same time, interior compartments 80 may be provided with a natural brushed finish with no visible welds for improved aesthetics.

Figure 17:
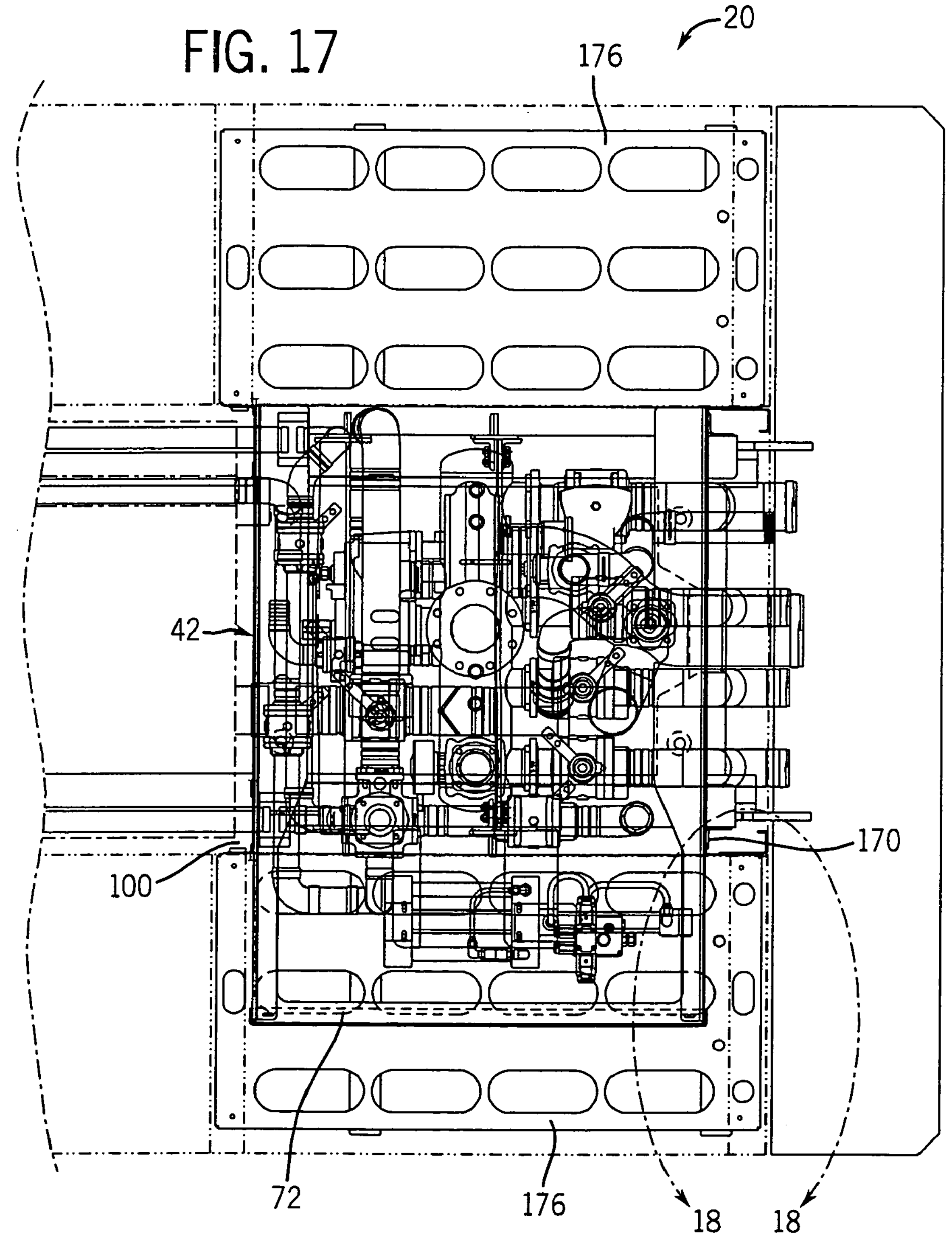
FIG. 17 is an enlarged fragmentary top plan view of a rear portion of the vehicle in FIG. 1 illustrating a control panel of a pumphouse module passing through an opening in a compartment.

FIGS. 17 and 18 illustrate a rearward-most compartment 80 of body section 78 in greater detail. Unlike other compartments 80 of sections 78 and 76, the rearward-most compartment 80 of section 78 additionally includes an opening 170 formed along rear bulkhead 100. Opening 170 is configured to enable control panel 72 of pumphouse module 42 to pass therethrough into the interior of the rearward-most compartment 80 of section 78. In the particular example, pumphouse module 42 additionally includes a platform or foot rail 176 which laterally projects from below section 78 outwardly beyond section 78 such that a portion of section 78 adjacent opening 170 extends between control panel 72 and platform 176. In the example shown, opening 170 has a perimeter which continually extends about an entirety of control panel 72. In other embodiments, opening 170 can be configured so as to have a perimeter that extends along less than all of the sides of control panel 72. Opening 170 enables body side section 78 to be laterally mounted to pumphouse module 42 and relative to the remainder of vehicle 20. Opening 170 further strengthens the connection between side body section 78 and pumphouse module 42. Opening 170 provides a cutout which enables control panel 72 as well as linkages to all be preassembled and remain in place as body section 78 is installed. Once control panel 72 has been inserted through opening 170, the interior of compartment 80 about opening 170 and about control panel 72 is trimmed with false bulkheads such as panel 132 shown in FIG. 18.

Overall, vehicle 20 provides a firefighting vehicle that is simpler to construct, that is better for high-speed maneuvering and that has a more attractive appearance as compared to conventional firefighting vehicles. Because vehicle 20 includes a pumphouse module, its pump, linkages and plumbing may all be preassembled at a separate station and then mounted to the remainder of vehicle 20, simplifying manufacture. Because rear body side sections 76 and 78 are mounted to vehicle 20 from the lateral sides of vehicle 20 rather than from above vehicle 20, assembly is further simplified. Because side body sections 76 and 78 are supported by pumphouse module 42 relative to frame 48 so as to move in unison with pumphouse module 42, control panel 72 and linkages may remain permanently in place during assembly and binding between operator linkages that would occur if section 78 and pumphouse module 42 were to move independently is minimized or prevented. Because vehicle 20 has cross members 62 to wrap about pump drive line 84, vehicle 20 has a lower center of gravity, improving the maneuverability of vehicle 20. Because vehicle 20 includes compartments having bulkheads 108, 110, 112 which are generally C-shaped, such compartments 80 provide at least partially concealed volumes for containing components of vehicle 20 and also enable false bulkheads or false ceilings to be releasibly supported to conceal any weld seams or other aesthetically unattractive results from the fabrication of compartment 80. Because vehicle 20 includes an opening in one of the compartments through which the control panel 72 of pumphouse module 42 extends, lateral assembly of body 44 is further facilitated in the preassembly of pumphouse module 42 is better enabled. Although each of the aforementioned features and benefits have been described as being utilized in conjunction with one another as part of a firefighting vehicle comprising a rear mount pumper, such features may alternatively be used independent of one another and may be used on other vehicles including those used for firefighting or for other purposes.

Although the present invention has been described with reference to example embodiments, workers skilled in the art will recognize that changes may be made in form and detail without departing from the spirit and scope of the invention. For example, although different example embodiments may have been described as including one or more features providing one or more benefits, it is contemplated that the described features may be interchanged with one another or alternatively be combined with one another in the described example embodiments or in other alternative embodiments. Because the technology of the present invention is relatively complex, not all changes in the technology are foreseeable. The present invention described with reference to the example embodiments and set forth in the following claims is manifestly intended to be as broad as possible. For example, unless specifically otherwise noted, the claims reciting a single particular element also encompass a plurality of such particular elements.

What is claimed is:

1. A firefighting vehicle comprising:

a frame;

a pumphouse module coupled to the frame as a single unit including a pump, plumbing and a pump control panel; and a body including a compartment, the compartment having an opening;

wherein at least a rear portion of the body is mounted to the pumphouse module with a portion of the pumphouse module extending through the opening in the compartment of the body, and with at least a rear portion of the body supported relative to the frame by the pumphouse module, so that at least a rear portion of the body moves in unison with the pumphouse module relative to the frame.

2. The firefighting vehicle of claim 1, wherein the frame includes a cross member and wherein the vehicle includes a drive line coupled to the pump and passing through the cross member.

3. The firefighting vehicle of claim 2, wherein the cross member has an upper side and includes an opening extending downwardly from the upper side.

4. The firefighting vehicle of claim 1, wherein the compartment includes a wall having a C-shaped bulkhead formed from one or more structures.

5. The firefighting vehicle of claim 4, wherein the bulkhead forms a cavity along a perimeter of an interior of at least one compartment and wherein the vehicle includes a component within the cavity.

6. The firefighting vehicle of claim 5, wherein the component is selected from a group of components including:

wire harnesses, breaker boxes, vents, shelving tracks, battery conditioners and generator controls.

7. The firefighting vehicle of claim 4 including a panel mounted to the bulkhead across the opening of the bulkhead.

8. The firefighting vehicle of claim 7, wherein the panel is fastened to the bulkhead by one or more fasteners.

9. The firefighting vehicle of claim 8, wherein the compartment has welded seams and wherein the panel conceals the seams.

10. The firefighting vehicle of claim 7, wherein the compartment has welded seams, wherein the panel is mounted to the bulkhead and wherein the panel conceals the seams.

11. The firefighting vehicle of claim 7 including a component within the cavity, wherein the panel conceals the component within the cavity.

12. The firefighting vehicle of claim 1, wherein the portion of the pumphouse module extending through the opening comprises a pump control panel.

13. The firefighting vehicle of claim 1, wherein the body includes a first side section and a second side section, the first side section and the second side section being joined to opposite sides of the pumphouse module.

14. The firefighting vehicle of claim 1 including elastomeric members between the frame and the pumphouse module.

15. A firefighting vehicle comprising:

a rotatably driven drive line;

a pump operably coupled to the drive line;

a frame supporting the pump, the frame including a cross member, wherein the cross member includes a recess and the drive line extends through the recess;

a pumphouse module coupled to the frame and including the pump, plumbing and a pump control panel joined as a single unit; and a body including a compartment having a C-shaped bulkhead, wherein the body is mounted to the pumphouse and is supported relative to the frame by the pumphouse module so as to move with the module relative to the frame.

16. The firefighting vehicle of claim 15, wherein the cross member has a perimeter and an opening extending from the perimeter.

17. The firefighting vehicle of claim 15, further including a cover extending over the recess and coupled to the cross member on opposite sides of the recess.

18. A firefighting vehicle, comprising:

a rotatably driven drive line;

a pump operably coupled to the drive line;

a frame supporting the pump, a first body section having a first compartment on a first transverse side of the pump; and a second body section having a second compartment on a second opposite transverse side of the pump such that the pump is sandwiched between the first body section and the second body section, and a pump control panel operably coupled to the pump and extending through an opening in the first compartment, so that the pump control panel is accessible from within the first compartment.

19. The firefighting vehicle of claim 18, wherein the compartment includes a first side wall having a C-shaped bulkhead with an opening and a mouth facing one side of the pump control panel, and a second side wall having a C-shaped bulkhead with an opening and a mouth facing an opposite side of the pump control panel.

20. A firefighting vehicle comprising:

a frame;

a fire suppression fluid pump supported by the frame; and a body having a first side section and a second side section, the first side section and the second side section being positioned on opposite sides of the pump, each side section defining a compartment having a forward end and a rearward end, the compartment including a first wall at the forward end, the first wall having a C-shaped bulkhead with a cavity and a mouth facing an interior of the compartment; and a panel joined to the bulkhead across the mouth to at least partially enclose the cavity.

21. The firefighting vehicle of claim 20 including a component within the cavity.

22. The firefighting vehicle of claim 21, wherein the component is selected from a group of components including:

wire harnesses, breaker boxes, vents, shelving tracks, battery conditioners and generator controls.

23. The firefighting vehicle of claim 20, wherein the panel is fastened to the bulkhead by one or more fasteners.

24. The firefighting vehicle of claim 23, wherein the compartment includes welded seams and wherein the panel conceals the seams.

25. The firefighting vehicle of claim 20, wherein the compartment has welded seams and wherein the panel is mounted to the bulkhead by fasteners so as to conceal the seams.

26. The firefighting vehicle of claim 20, wherein the compartment has an opening and wherein the firefighting vehicle further includes a pump control panel extending through the opening.

27. The firefighting vehicle of claim 20 wherein the pump is contained within a pumphouse module that is mounted to the frame, and the body is mounted to the pumphouse module so that the body is indirectly supported by the frame through the pumphouse module.

28. A firefighting vehicle comprising:

a frame;

a pumphouse module having a pump, plumbing and a pump control panel joined as a single unit;

a body including a compartment, the compartment having an opening through which the pump control panel extends;

wherein the pumphouse module is coupled to the frame, and at least a rearward end of the body is mounted to the pumphouse module and is supported relative to the frame by the pumphouse module so as to move in unison with the pumphouse module relative to the frame.

29. The firefighting vehicle of claim 28, including elastomeric members coupled between the frame and the pumphouse module.

30. The firefighting vehicle of claim 28, wherein the compartment includes a side wall having a C-shaped bulkhead.

31. The firefighting vehicle of claim 28 including a pump operably coupled to the control panel, wherein the body includes a first section on a first side of the pump and a second section on a second opposite side of the pump.

32. A method of constructing a firefighting vehicle, the method comprising:

preassembling a pumphouse module including a pump, plumbing and a pump control panel joined as a single unit;

mounting the module to a vehicle frame;

preassembling a first side body section and a second side body section;

mounting the first body section relative to the pumphouse module on a first side of the pumphouse module;

mounting the second body section relative to the pumphouse module on a second side of the pumphouse module; and mounting at least a rearward portion of the first body section and a rearward portion of the second body section directly to opposite sides of the pumphouse module such that the rearward portions of the first body section and the second body section move in unison with the pumphouse module relative to the frame.

33. The method of claim 32 including passing the control panel through a horizontal opening in the first body section.

34. A firefighting vehicle comprising:

a frame;

a pumphouse module coupled to the frame as a single unit including a pump, plumbing and a pump control panel; and a body including a compartment, the compartment having an opening;

wherein at least a rear portion of the body is mounted to the pumphouse module with a portion of the pumphouse module extending through the opening in the compartment of the body, and with at least a rear portion of the body supported relative to the frame by the pumphouse module;

wherein the frame includes a cross member and wherein the vehicle includes a drive line coupled to the pump and passing through the cross member.

35. The firefighting vehicle of claim 34, wherein the body includes a first side section and a second side section, the first side section and the second side section being joined to opposite sides of the pumphouse module.

36. A firefighting vehicle comprising:

a frame;

a pumphouse module coupled to the frame as a single unit including a pump, plumbing and a pump control panel; and a body including a compartment, the compartment having an opening;

wherein at least a rear portion of the body is mounted to the pumphouse module with a portion of the pumphouse module extending through the opening in the compartment of the body, and with at least a rear portion of the body supported relative to the frame by the pumphouse module;

wherein the compartment includes a wall having a C-shaped bulkhead formed from one or more structures.

37. The firefighting vehicle of claim 36, wherein the portion of the pumphouse module extending through the opening comprises a pump control panel.

* * * * *